(12) United States Patent
Lu et al.

(10) Patent No.: US 10,789,703 B2
(45) Date of Patent: Sep. 29, 2020

(54) SEMI-SUPERVISED ANOMALY DETECTION IN SCANNING ELECTRON MICROSCOPE IMAGES

(71) Applicant: KLA-TENCOR CORPORATION, Milpitas, CA (US)

(72) Inventors: Shaoyu Lu, Fremont, CA (US); Li He, San Jose, CA (US); Sankar Venkataraman, Milpitas, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 184 days.

(21) Appl. No.: 16/106,341

(22) Filed: Aug. 21, 2018

(65) Prior Publication Data

US 2019/0287230 A1    Sep. 19, 2019

Related U.S. Application Data

(60) Provisional application No. 62/644,962, filed on Mar. 19, 2018.

(51) Int. Cl.
*G06T 7/00* (2017.01)
*G06N 3/04* (2006.01)

(52) U.S. Cl.
CPC ............... *G06T 7/001* (2013.01); *G06N 3/04* (2013.01); *G06T 2207/10061* (2013.01); *G06T 2207/20081* (2013.01); *G06T 2207/20084* (2013.01); *G06T 2207/30148* (2013.01)

(58) Field of Classification Search
CPC ........... G06T 7/001; G06T 2207/30148; G06T 2207/20084; G06T 2207/20081; G06T 2207/10061; G06T 7/0004; G06N 3/04
See application file for complete search history.

(56) References Cited

U.S. PATENT DOCUMENTS

| | | |
|---|---|---|
| 2012/0163698 A1 | 6/2012 | Michelsson |
| 2016/0140408 A1 | 5/2016 | Shen et al. |
| 2016/0163035 A1 | 6/2016 | Chang et al. |
| 2017/0140524 A1 | 5/2017 | Karsenti et al. |
| 2017/0193400 A1 | 7/2017 | Bhaskar et al. |
| 2018/0157937 A1* | 6/2018 | Kang ..................... G06K 9/66 |

FOREIGN PATENT DOCUMENTS

| | | |
|---|---|---|
| KR | 20080024217 A | 3/2008 |
| KR | 101836096 B1 | 3/2018 |

OTHER PUBLICATIONS

Lin, F., & Cheng, K. T. (Jan. 2017). An artificial neural network approach for screening test escapes. In 2017 22nd Asia and South Pacific Design Automation Conference (ASP-DAC) (pp. 414-419). IEEE (Year: 2017).*
WIPO, ISR for PCT/US2019/022655, Jul. 4, 2019.

(Continued)

*Primary Examiner* — Menatoallah Youssef
(74) *Attorney, Agent, or Firm* — Hodgson Russ LLP (57) ABSTRACT

Autoencoder-based, semi-supervised approaches are used for anomaly detection. Defects on semiconductor wafers can be discovered using these approaches. The model can include a variational autoencoder, such as a one that includes ladder networks. Defect-free or clean images can be used to train the model that is later used to discover defects or other anomalies.

20 Claims, 11 Drawing Sheets

(56) References Cited

OTHER PUBLICATIONS

Sonderby et al., Ladder Variational Autoencoders, 29th Conference on Neural Information Processing Systems, 2016, pp. 1-12.

Sonderby et al., How to Train Deep Variational Autoencoders and Probabilistic Ladder Networks, Proc. of the 33rd Int'l Conf. on Machine Learning, 2016.

An & Cho, "Variational autoencoder based anomaly detection using reconstruction probability," SNU Data Mining Center, Tech. Rep., 2015.

Rasmus et al., Semi-Supervised Learning with Ladder Networks, Proc. of the 28th International Conference on Neural Information Processing Systems, vol. 2, pp. 1-19, 2015.

Escalante, A Comparison of Outlier Detection Algorithms for Machine Learning, 2005.

Shamir, Unsupervised Detection of Outlier Images Using Multi-Order Image Transforms, Theory and Applications of Mathematics & Computer Science, 2013, 3 (1), pp. 13-31.

\* cited by examiner

FIG. 10

SEMI-SUPERVISED ANOMALY DETECTION IN SCANNING ELECTRON MICROSCOPE IMAGES

CROSS-REFERENCE TO RELATED APPLICATIONS

This application claims priority to the provisional patent application filed Mar. 19, 2018 and assigned U.S. App. No. 62/644,962, the disclosure of which is hereby incorporated by reference.

FIELD OF THE DISCLOSURE

This disclosure relates to anomaly detection in images and, more particularly, to anomaly detection in scanning electron microscope images of semiconductor wafers.

BACKGROUND OF THE DISCLOSURE

Evolution of the semiconductor manufacturing industry is placing ever greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process induced failures, in some cases, tend to be systematic. That is, process-induced failures tend to fail at predetermined design patterns often repeated many times within the design. Elimination of spatially-systematic, electrically-relevant defects can have an impact on yield.

Inspection, such as with a scanning electron microscope (SEM), is becoming more essential as the size of semiconductor devices shrinks. Current algorithms that are used in inspection tend to require customized features. There is learning involved in the system, but it tends to happen in an ad hoc manner and at a high level in a loop typically involving an SEM review where the results of the inspection are deemed as true defects, false alarms, nuisance, etc. The relationships between process-related causes and an operator's ability to observe the effects are so complex that conventional methods do not lend themselves to converging on recipes that take full advantage of the raw capability of the inspection equipment used to control the semiconductor manufacturing process.

Anomaly detection in SEM images (e.g., defect detection) was performed using a manual method. Before inspection with the electron beam, an operator used information about a defect population from another tool, such as an optical inspection tool. Then the operator relied on statistics to find the location of anomaly patterns, or just visually searched for the defects by reviewing SEM images. This is a manual technique, which is tedious and prone to errors. Visual review by an operator can be time-consuming.

Anomaly detection in SEM images (e.g., defect detection) also was performed using supervised machine learning. An operator annotated defects on SEM images to create a training set to train a machine learning model. This model could then be used for inspection. Like the other previous technique, this is a partially manual technique, which is tedious and prone to errors. The annotation process tends to be difficult because of the small and subtle characteristic of the defects. For example, different operators may have different definitions of what the "anomaly" patterns look like. This creates unexpected error behavior during the anomaly detection. Furthermore, the anomaly population is usually small compared with the nominal population. An operator needed to find anomaly patterns in a huge population of nominal patterns, which can be challenging.

Therefore, what is needed is an improved technique for anomaly detection.

BRIEF SUMMARY OF THE DISCLOSURE

A system is provided in a first embodiment. The system comprises a wafer inspection tool and a processor in electronic communication with the wafer inspection tool. The wafer inspection tool is configured to generate images of a wafer, and includes an electron beam source and a detector. The processor operates a model configured to find one or more anomalies in the image. The model is trained using semi-supervised machine learning based on only defect-free training images of semiconductor devices.

The wafer inspection tool can be an SEM.

The model can include a variational autoencoder. The variational autoencoder may include ladder networks.

A method is provided in a second embodiment. An image of a wafer is received at a processor. The processor operates a model configured to find one or more anomalies in the image. The model is trained using semi-supervised machine learning based on only defect-free training images of semiconductor devices. Presence of one or more anomalies in the image is determined using the model.

The image may be an SEM image.

The training can use nominal patterns.

The model can include a variational autoencoder. The variational autoencoder may include ladder networks.

The method can further include obtaining the image using a wafer inspection tool. In an instance, the wafer inspection tool is an SEM.

The one or more anomalies can each be one of an anomaly patch or an anomaly region.

The method can further include determining, using the processor, a distance between the image and the defect-free training images in a feature space and determining, using the processor, if the image is an outlier based on the distance.

The method can further include determining, using the processor, if the image is an outlier using a generative adversarial network with an autoencoder as a generator and a convolutional neural network as a discriminator.

A non-transitory computer-readable storage medium is provided in a third embodiment. The non-transitory computer-readable storage medium comprises one or more programs for executing a model on one or more computing devices. The model is trained using semi-supervised machine learning based on only defect-free training images of semiconductor devices. The model is configured to receive an image of a wafer and determine presence of one or more anomalies in the image.

The image may be an SEM image.

The model can be trained using nominal patterns.

The model can include a variational autoencoder. The variational autoencoder may include ladder networks.

The model can be configured to perform outlier detection thereby detecting anomalies.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

An autoencoder-based semi-supervised approach is used for anomaly (e.g., defect) detection. While supervised or unsupervised approaches are feasible, supervised machine learning requires a tedious and expensive manual labeling process and an unsupervised machine learning approach is difficult to adapt to different data. Therefore, a semi-supervised approach for anomaly detection can be used instead of a supervised or unsupervised approach. The semi-supervised approach may require fewer manual steps, such as selecting clean SEM images.

Embodiments disclosed herein use semi-supervised machine learning for anomaly detection. By semi-supervised, operators provide a training data set. However, an operator only needs to select clean SEM images for the training data set, which can be easier than annotating defective images.

Figure 1:
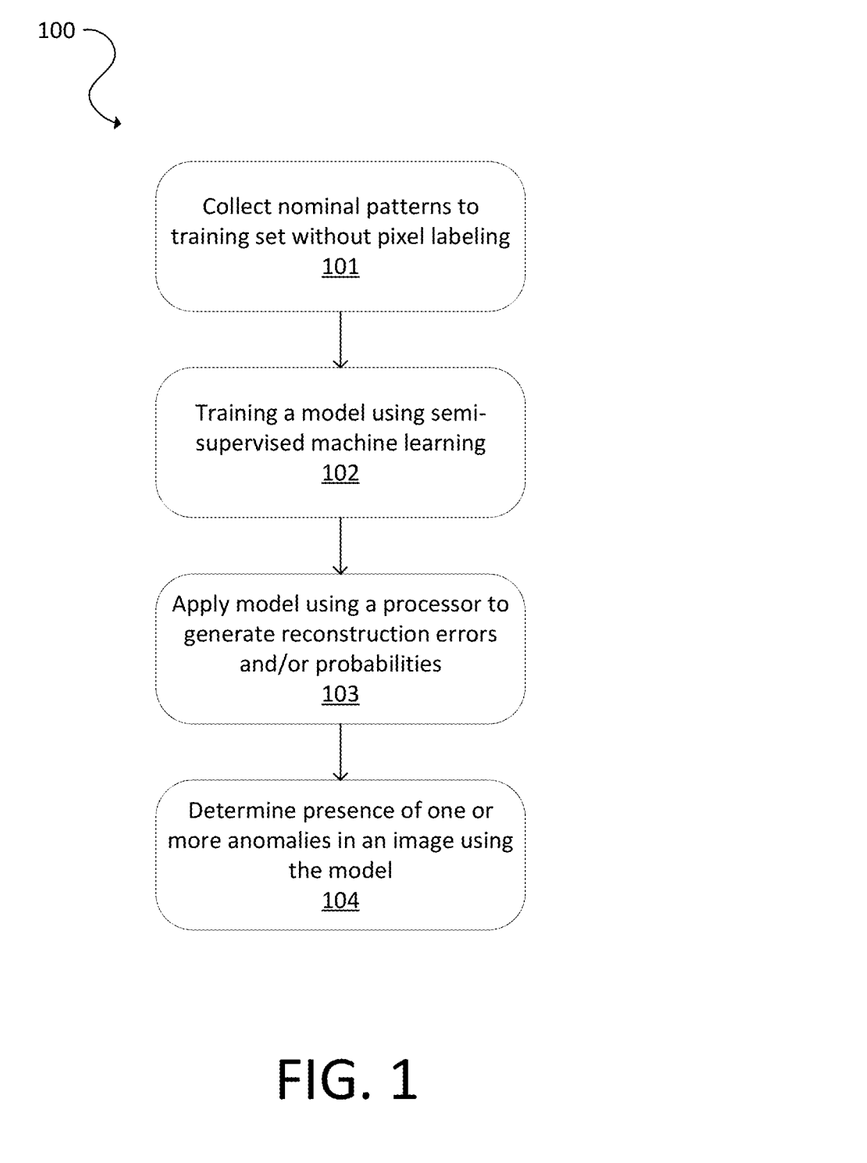
FIG. 1 is a flowchart of an embodiment of a method in accordance with the present disclosure.

FIG. 1 is a flowchart of an embodiment of a method 100. Nominal patterns are collected at 101 to make a training set. These nominal patterns may not include pixel labeling. In an example, SEM images may be used as the training set.

In an instance, the training set includes images of semiconductor structures, dies, or parts of a semiconductor wafer surface. Only clean (e.g., defect-free) images may be present in the training set. Clean images in the training set may be labeled as clean, defect-free, or another similar label. Pixel-level annotation of the training set may be unnecessary because the training set only includes clean images.

Images with defects can be used to validate the model. For example, images with defects can be used to validate or can be used as test images. Labeled images with defects or labeled defects in images can be used to validate the model. Unlabeled images with defects can be used to test the model.

Turning back to FIG. 1, the model is trained at 102 using semi-supervised machine learning. This may use nominal patterns, which in this instance includes defect-free training images. The model is trained to represent a distribution of nominal patterns.

The model is applied at 103 using a processor to find one or more anomalies in image patches. The model can generate reconstruction errors and/or probabilities. The model can predict whether a patch is abnormal by examining the patch level reconstruction error and/or probabilities. The anomaly region can be identified by thresholding the pixel-level reconstruction error and/or probabilities.

For example, reconstructed images can be generated from input SEM images by applying the model at 103.

The autoencoder may perform best on repeated patterns like an array or dot. Other methods like a generative adversarial network (GAN) can be used to reconstruct more complex patterns.

At 104, a presence of one or more anomalies in an image is determined using the model. Threshold reconstruction errors or probabilities can be used to find an anomaly patch or region in the image. For example, a difference between reconstructed and original SEM images may be calculated at 104 to locate the anomaly patterns (e.g., defects).

An image of a wafer may be received at the processor prior to 103 or prior to 104. The image may be an SEM image. The image of the wafer may be obtained using a wafer inspection tool, such as an SEM.

In an instance, the model includes a variational autoencoder. The variational autoencoder can include ladder networks. The autoencoder also may be a convolutional neural network (CNN) autoencoder or other types of autoencoders.

Figure 2:
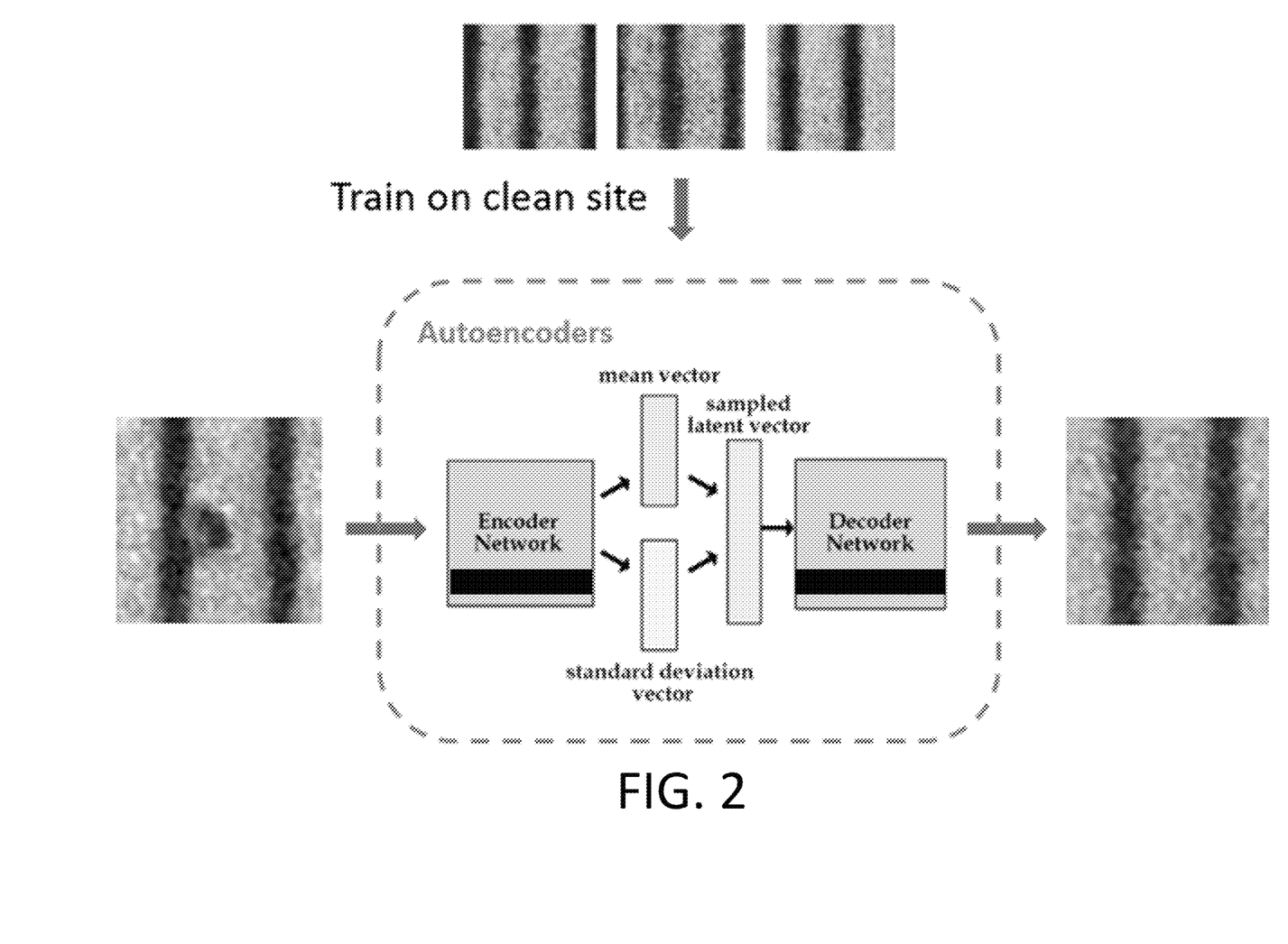
FIG. 2 illustrates using an autoencoder for workflow operation including training the autoencoder on clean sites and running inference with test sites that may contain defects.

A variational autoencoder can provide a probabilistic manner for describing an observation in latent space. Thus, a variational autoencoder can describe a probability distribution for each latent attribute. Each input image can be described in terms of latent attributes, such as using a probability distribution for each attribute. The variational autoencoder can use an encoder and a decoder during workflow operation, as seen in FIG. 2. The autoencoder can be trained on clean sites and inference can be run with test sites that may contain defects. The architecture of the variational autoencoder that includes an encoder and decoder can be seen in FIG. 3.

Figure 3:
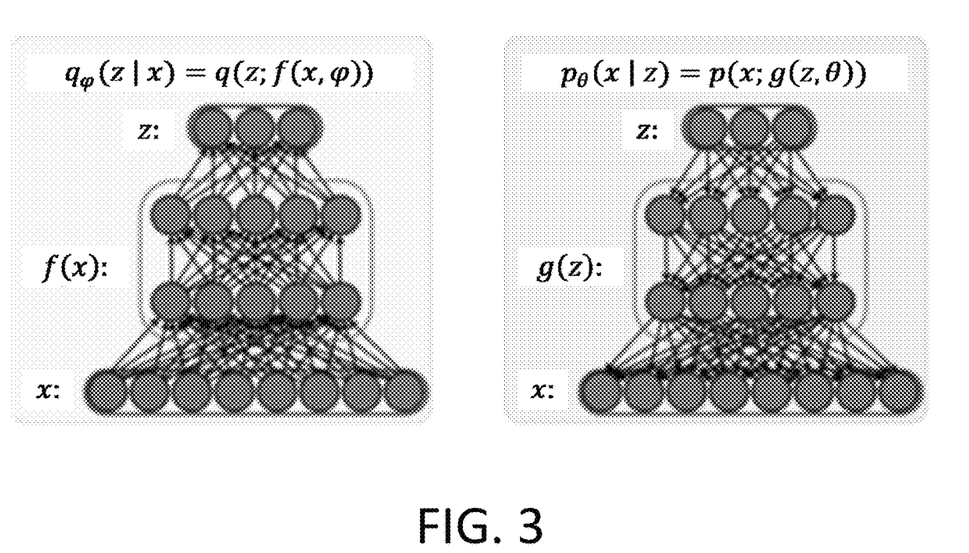
FIG. 3 illustrates an architecture of a variational autoencoder that includes an encoder and a decoder.

As seen in FIG. 3, x stands for the input variable and z is the latent variable which lives in a lower-dimensional hidden space. For encoding, f(x) stands for an encoder mapping from x to z, which is made of n sets of an affine mapping (via W and b) followed by a nonlinearity σ (see Eq. 1), where n is the number of hidden layers, and ⊛ indicates convolution. For decoding, g(z) represents the complex decoding process that results in the reconstructed data $\tilde{x}$, which is modeled in the structure of a neural network similar as encoder.

A neural network with a single hidden layer has an encoder and decoder as in Eq. 1 and Eq. 2, respectively.

$$z = \sigma(W_{xz} \circledast x + b_{xz}) \quad \text{(Eq. 1)}$$

$$\tilde{x} = \sigma(W_{zx} \circledast z + b_{zx}) \quad \text{(Eq. 2)}$$

Eq. 1 and Eq. 2 describe the deterministic encoding and decoding mappings. A variational autoencoder (VAE) aims to model the distributions rather than the real values of the latent variable. As in FIG. 3, $q_\phi(z|x)$ is the approximate posterior and $p_\theta(z)$ is the prior distribution of latent variable z. The loss function (Eq. 3) aims to minimize the KL divergence ($D_{KL}$) between the posterior and prior distribution, and to minimize the reconstruction errors (Eq. 4) with a weight of λ. n is the number of layers.

$$\mathcal{L} = \Sigma_{i=0}^n D_{KL}(q_\phi(z|x) \| p_\theta(z)) + \lambda \|\tilde{x} - x\| \quad \text{(Eq. 3)}$$

An advantage of a variational autoencoder is its latent variables are stochastic variables. Sometimes the nominal and defect data can share the same mean, but their deviations can be different. The variational autoencoder takes into account the distribution difference between an original input and reconstructed data, which improves accuracy and robustness.

Variational autoencoder principles can include the following two features. The approximate posterior can be modeled by a neural network, such as a CNN. In an instance, f(x) outputs the parameters of the approximate posterior q and sample z for one realization. For the prior distribution of latent variable, assume isotropic distributions (e.g., Bernoulli for binary value and Multivariate Gaussian for continuous value), and z can be sampled for one realization.

Ladder networks for variational autoencoders may provide improved results compared to a variational autoencoder without ladder networks or a traditional autoencoder. In an instance, ladder networks for variational autoencoder may provide improved results for continuous valued images.

Figure 4:
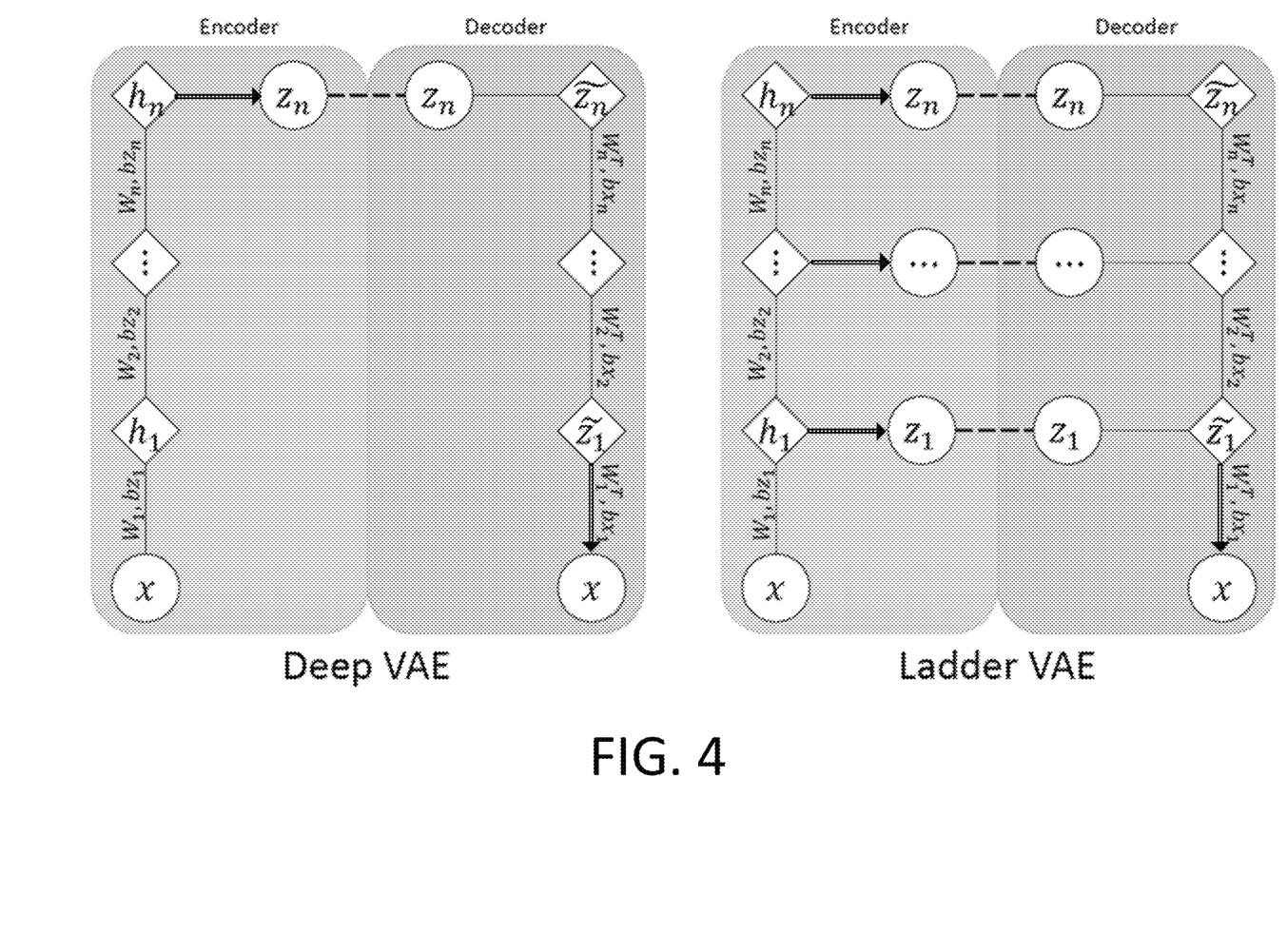
FIG. 4 illustrates an exemplary deep convolutional neural network and ladder variational autoencoder architectures.

A ladder architecture may be selected instead of a deep CNN architecture. FIG. 4 illustrates the inference and generative models for a deep CNN variational autoencoder (left) and a ladder variational autoencoder (right). Circles indicate stochastic nodes and diamonds indicate deterministically nodes. Double lines denote conditional probabilities, solid lines denote deterministic mappings, dash lines indicate regularization to match prior $p_\theta(z)$ with posterior $q_\phi(z|x)$ by KL divergence (Eq. 3). The ladder variational autoencoder overcomes overfitting by connecting shallow layers via additional regularization.

However, in another example, a CNN was included in the encoder and decoder parts of a variational autoencoder.

Embodiments of the method disclosed herein can be used as defect detection for repeated patterns like array patterns. Any type of semiconductor defect can be detected using the disclosed variational autoencoder if the nominal patterns are simple and repeatable patterns, such as array patterns. More complex patterns also can be detected, and the simple and repeatable patterns are merely listed as examples. Furthermore, other semi-supervised or unsupervised techniques can be used to improve performance with more complex patterns. Outliers of these patterns can be identified. Defects such as, for example, particles, missing voids, gray-scale changing, or thinner fins may be identified. Other types of defects also can be identified.

Embodiments of the method described herein can be configured to perform outlier detection. This can be used to detect anomalies.

In a first embodiment, outliers can be determined using distance in a feature space. Some machine learning feature vectors are extracted from the defect-free training images. When new images are passed in during a test job run, the same types of feature vectors can be extracted from these new images. How far a feature vector of one new image is from the feature vectors of all defect-free training images can be determined. If the distance exceeds a threshold, then the new image is considered an outlier. For example, a center of mass for the image dataset in the defect-free training data can be determined. The distance between the new image and this center of mass can be determined, which can be used to find outliers.

In a second embodiment, outliers can be determined using a GAN with one CNN as its discriminatory network. A GAN is composed of two networks: a generator network followed by a discriminator network. The autoencoder can be used as the generator and the CNN can be used as the discriminator. All training images for autoencoder may be nominal (i.e., defect-free). Reconstruct images can be generated by this autoencoder using these training images as examples. Some look more real (like nominal images) and some look more fake (like anomaly images). The job of the discriminator is to determine from these generated images which are real and which are fake. After the training finishes, the discriminator network will have the ability to determine which image is nominal (real) while which is anomaly (fake). Thus, the new images (test images) can be passed to the CNN discriminator network to find out if the images are anomaly or not. In this way, GAN can be used to find outliers in new data.

Embodiments of the method disclosed herein can be used as a nuisance filter instead of classification, which is supervised. If an existing detection model is present, the output will be SEM patch images that have a high potential of being defective. The semi-supervised model can be trained with same patch size images from the clean sites of the same SEM layer, then the detection output patches can be passed to this model. The defective patches will be filtered with higher reconstruction errors. Nuisance patches will be marked clean after this filter.

The semi-supervised flow minimizes operator interaction for anomaly detection. This avoid tedious and error-prone manual labeling of detects by operators. This can eliminate the need to search or paint defects, which reduces the time needed to provide data to train the model.

Only nominal patterns may be used to train the model to detect anomalies, which can reduce the burden on operators to train a machine model. Thus, only clean SEM images may be needed. As a result, there is an enormous amount of possible training data that can be used because nominal patterns tend to dominate most populations. This avoids or reduces the number of labeled defective images. Thus, overfitting for complicated artificial intelligence models can potentially be avoided.

The semi-supervised flow also can provide improved performance. With supervised machine learning, limit data can be used for training. However, with the embodiments disclosed herein, a large number of data can be used because only clean SEM images are required. This can generate better cap rate and nuisance rate in defect detection.

By learning what clean images look like, reconstruction errors during reconstruction of a new image would be indicative of the defect if present in the new image. Training with clean and defective images may corrupt the model.

The embodiments disclosed herein can provide a throughput improvement by reducing setup time. Data preparation for model training may be faster. For example, labeling clean images for the entire image is much faster than pixel-level annotation for defect locations.

In another embodiment, an unsupervised machine learning algorithm can be used for this method without manual annotation of images. The unsupervised machine learning is performed instead of the semi-supervised machine learning. Use of unsupervised learning may increase complexity. As the anomaly data points are fewer than the nominal data points, it can be difficult to model their distributions and separate them. While feasible, it can be difficult to train a model that fits SEM images from different layer and device. Semi-supervised machine learning may be used instead, which takes advantages of volumes of easy-to-obtain nominal data points with a minimum amount of operator time needed to find clean images.

Figure 5:
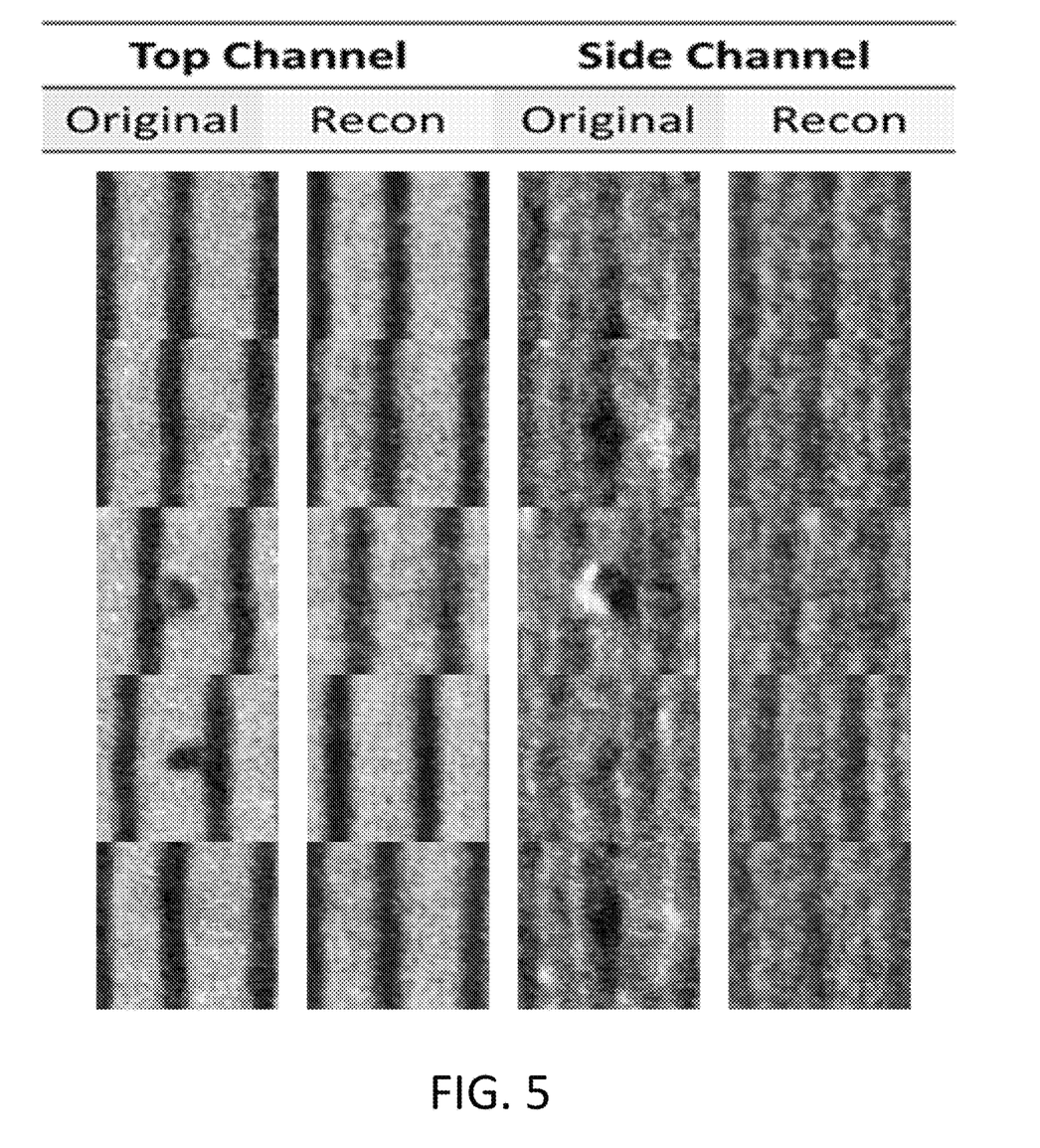
FIG. 5 illustrates input and reconstructed anomaly SEM patches with an autoencoder.

FIG. 5 illustrates input and reconstructed SEM patches with an autoencoder. Defective regions are not reconstructed because the training set only contains background patches. Thus, anomaly patches will have higher reconstruction errors.

Figure 6:
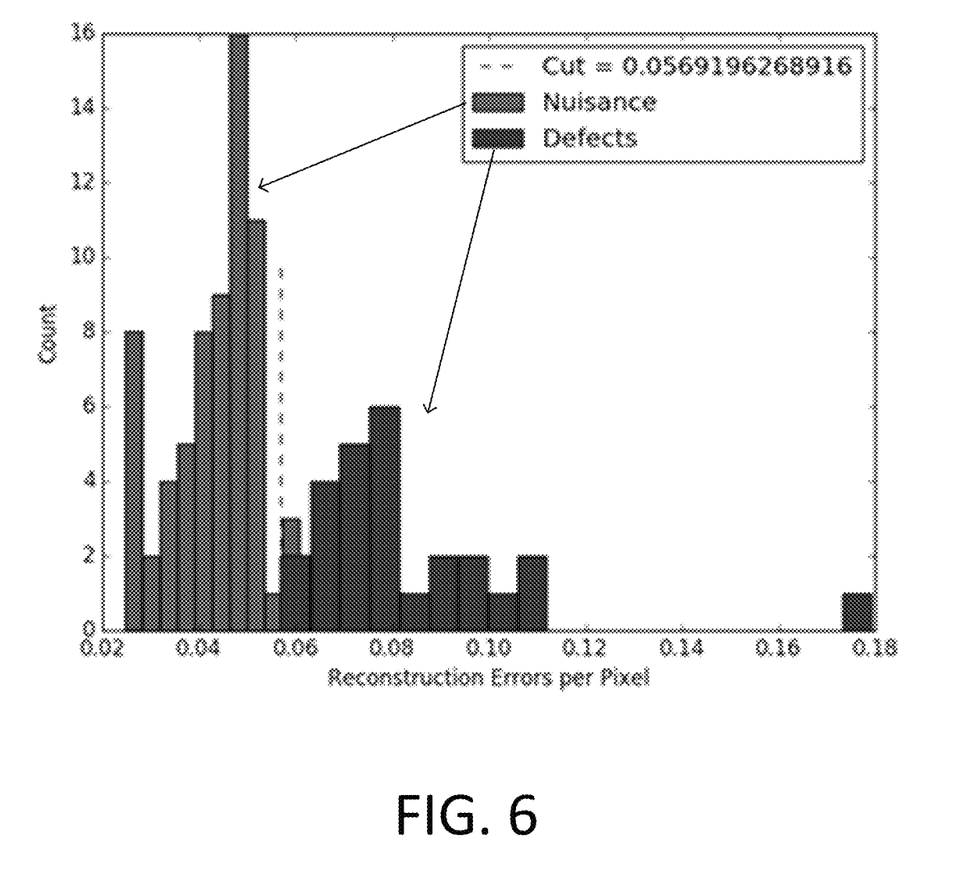
FIG. 6 a reconstruction error histogram, wherein the ground truth can be seen based on shading.

FIG. 6 a graph of reconstruction errors. A threshold is used to distinguish anomaly from nominal. In one test, the capture rate was 100% and the nuisance rate was 27.8%. The nuisance and defect results in FIG. 6 are illustrated with different widths and shading.

The reconstruction error can be defined as the difference between the original input vector x and the reconstruction $\tilde{x}$ as in Eq. 4.

$$\text{error} = \|\tilde{x} - x\| \quad \text{(Eq. 4)}$$

Since a variational autoencoder models the distribution of nominal data, anomalies are expected to have higher reconstruction errors (Eq. 4). FIG. 6 shows that reconstruction error can exhibit two modal distributions, which makes it possible for auto-thresholding to separate anomalies from nominal. For example, the Otsu algorithm can be applied to log scaled reconstruction error to better exploit dynamic range, but map it back to original scale for plotting. This works because reconstruction probability is proportional to log-scale of reconstruction errors and AVE models reconstruction probability as Gaussian distribution.

Figure 7A:
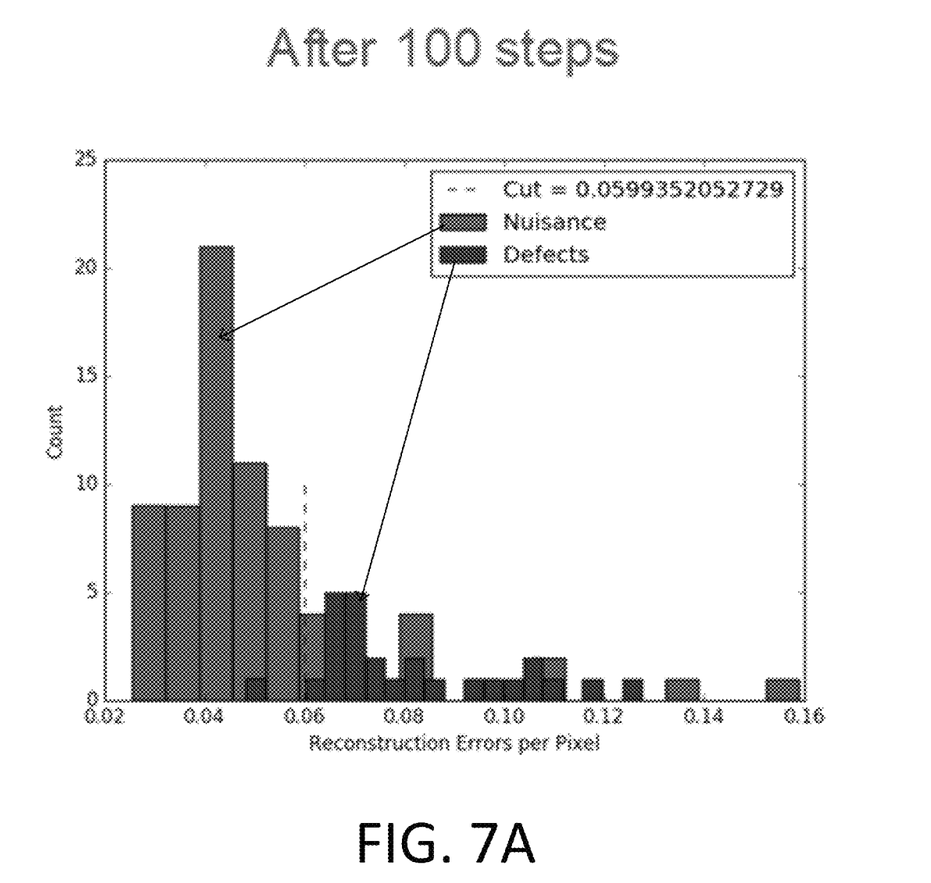
FIGS. 7A-7C are reconstruction error histograms after 100 steps, 200 steps, and 2000 steps.
Figure 7B:
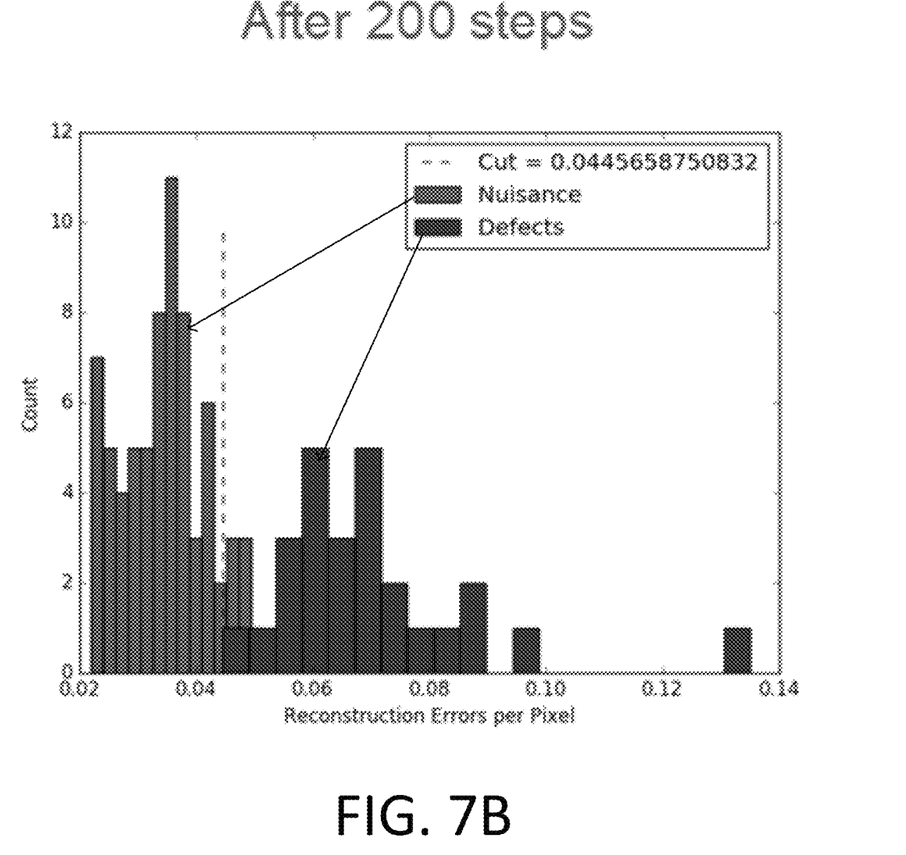
Figure 7C:
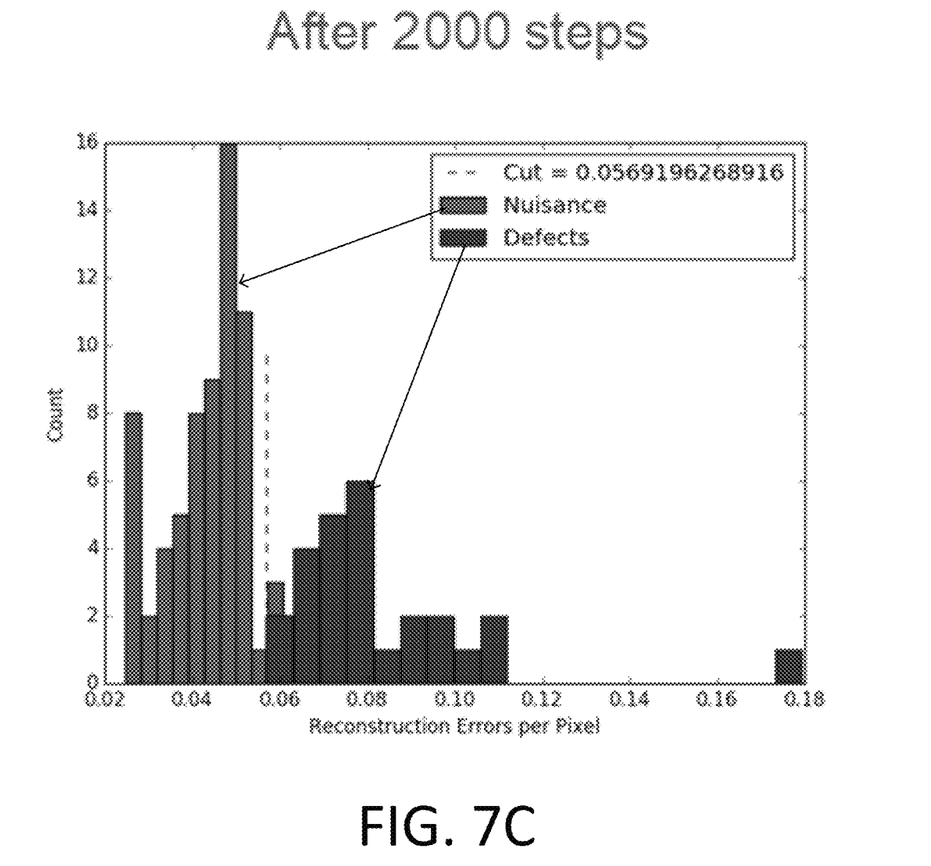
Figure 8:
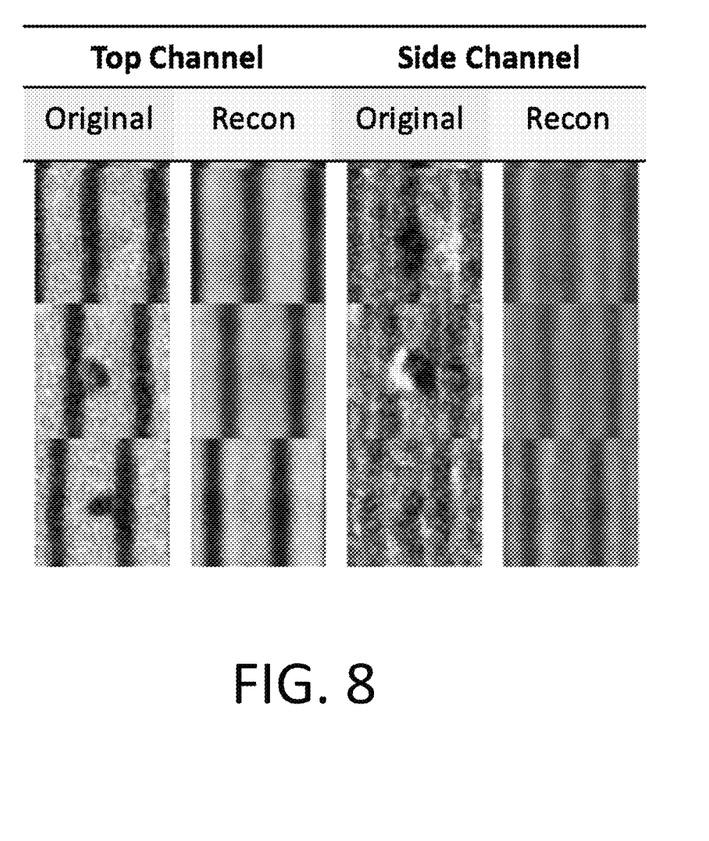
FIG. 8 illustrates input and reconstructed SEM patches with an autoencoder after 200 steps.

FIGS. 7A-7C are graphs of reconstruction errors after 100 steps, 200 steps, and 2000 steps. This uses the same training input data as FIG. 5, which includes array-like nominal SEM images. The workflow can be described in FIG. 2. The clean images are only used for training the autoencoder. Different autoencoder models are trained with the same training data with 100 steps, 200 steps, and 2000 steps. Then the validation data, which contains some images with defects, was passed in. FIG. 8 shows the input images with defects and the reconstructed images with these three trained autoencoder models. The more steps that were trained, the better the reconstructed images. However, from the error histogram separation, the 200 steps model may be sufficient to separate anomaly from nominal validation images, although longer training can be performed to get better reconstructed images. The nuisance and defect results in FIGS. 7A-7C are illustrated with different widths and shading.

Figure 9:
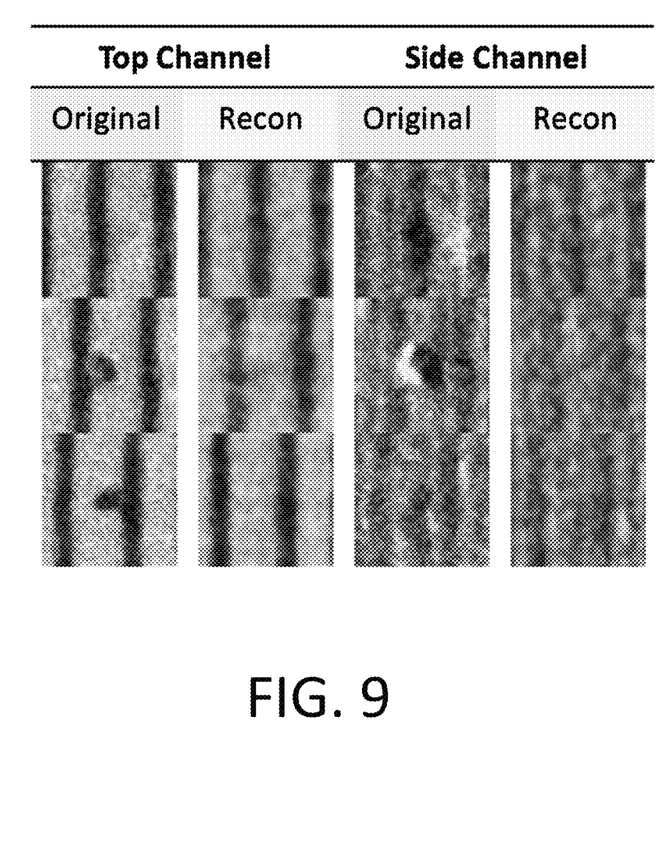
FIG. 9 illustrates input and reconstructed SEM patches with an autoencoder after 2000 steps.

FIG. 8 illustrate input and reconstructed SEM patches with an autoencoder after 200 steps. FIG. 9 illustrate input and reconstructed SEM patches with an autoencoder after 2000 steps.

Figure 10:
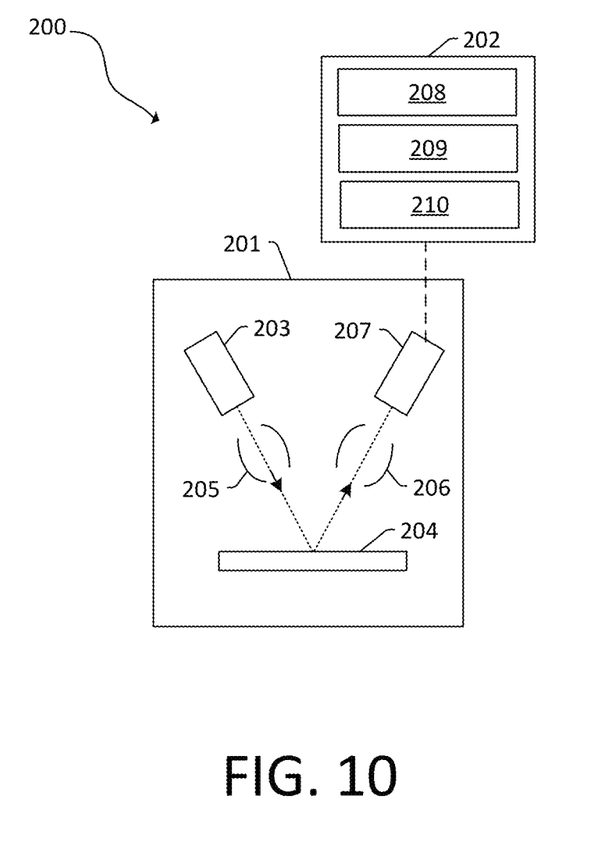
FIG. 10 is a block diagram of an embodiment of a system in accordance with the present disclosure.

FIG. 10 is a block diagram of an embodiment of a system 200. The system 200 includes a wafer inspection tool (which includes the electron column 201) configured to generate images of a wafer 204.

The wafer inspection tool includes an output acquisition subsystem that includes at least an energy source and a detector. The output acquisition subsystem may be an electron beam-based output acquisition subsystem. For example, in one embodiment, the energy directed to the wafer 204 includes electrons, and the energy detected from the wafer 204 includes electrons. In this manner, the energy source may be an electron beam source. In one such embodiment shown in FIG. 10, the output acquisition subsystem includes electron column 201, which is coupled to computer subsystem 202. A chuck (not illustrated) may hold the wafer 204.

As also shown in FIG. 10, the electron column 201 includes an electron beam source 203 configured to generate electrons that are focused to wafer 204 by one or more elements 205. The electron beam source 203 may include, for example, a cathode source or emitter tip. The one or more elements 205 may include, for example, a gun lens, an anode, a beam limiting aperture, a gate valve, a beam current selection aperture, an objective lens, and a scanning subsystem, all of which may include any such suitable elements known in the art.

Electrons returned from the wafer 204 (e.g., secondary electrons) may be focused by one or more elements 206 to detector 207. One or more elements 206 may include, for example, a scanning subsystem, which may be the same scanning subsystem included in element(s) 205.

The electron column also may include any other suitable elements known in the art.

Although the electron column 201 is shown in FIG. 10 as being configured such that the electrons are directed to the wafer 204 at an oblique angle of incidence and are scattered from the wafer 204 at another oblique angle, it is to be understood that the electron beam may be directed to and scattered from the wafer 204 at any suitable angles. In addition, the electron beam-based output acquisition subsystem may be configured to use multiple modes to generate images of the wafer 204 (e.g., with different illumination angles, collection angles, etc.). The multiple modes of the electron beam-based output acquisition subsystem may be different in any image generation parameters of the output acquisition subsystem.

Computer subsystem 202 may be coupled to detector 207 as described above. The detector 207 may detect electrons returned from the surface of the wafer 204 thereby forming electron beam images of the wafer 204. The electron beam images may include any suitable electron beam images. Computer subsystem 202 may be configured to perform any of the functions described herein using the output of the detector 207 and/or the electron beam images. Computer subsystem 202 may be configured to perform any additional step(s) described herein. A system 200 that includes the output acquisition subsystem shown in FIG. 10 may be further configured as described herein.

It is noted that FIG. 10 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Although the output acquisition subsystem is described above as being an electron beam-based output acquisition subsystem, the output acquisition subsystem may be an ion beam-based output acquisition subsystem. Such an output acquisition subsystem may be configured as shown in FIG. 10 except that the electron beam source may be replaced with any suitable ion beam source known in the art. In addition, the output acquisition subsystem may be any other suitable ion beam-based output acquisition subsystem such as those included in commercially available focused ion beam (FIB) systems, helium ion microscopy (HIM) systems, and secondary ion mass spectroscopy (SIMS) systems.

The computer subsystem 202 includes a processor 208, an electronic data storage medium 209, and a machine learning module 210. The processor 208 may include a microprocessor, a microcontroller, or other devices. The machine learning module 210 is illustrated as separate from the processor 208, but may be run on, stored on, or otherwise be part of the processor 208 and/or electronic data storage medium 209. The computer subsystem 202 optionally may be in electronic communication with a wafer metrology tool or a wafer review tool (not illustrated) to receive additional information.

The computer subsystem 202 may be coupled to the components of the system 200 in any suitable manner (e.g., via one or more transmission media, which may include wired and/or wireless transmission media) such that the processor 208 can receive output. The processor 208 may be configured to perform a number of functions using the output. The wafer inspection tool can receive instructions or other information from the processor 208. The processor 208 and/or the electronic data storage unit 209 optionally may be in electronic communication with another wafer inspection tool, a wafer metrology tool, or a wafer review tool (not illustrated) to receive additional information or send instructions.

The processor 208 is in electronic communication with the wafer inspection tool, such as with the detector 207. The processor 208 may be configured to process images generated using measurements from the detector 207. The processor 208 can be configured to find one or more anomalies in the image or images using a model. The model can be trained using semi-supervised machine learning.

In an instance, the model includes a variational autoencoder. The variational autoencoder can include ladder networks. The machine learning module 210 can be used to generate the model that is run on the processor 208. The machine learning module 210 may be in electronic communication with a source of images for the training set, such as a database or drive on an electronic data storage medium.

The computer subsystem 202, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool.

The processor 208 and electronic data storage unit 209 may be disposed in or otherwise part of the system 200 or another device. In an example, the processor 208 and electronic data storage unit 209 may be part of a standalone control unit or in a centralized quality control unit. Multiple processors 208 or electronic data storage unit 209 may be used.

The processor 208 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 208 to implement various methods and functions may be stored in readable storage media, such as a memory in the electronic data storage unit 209 or other memory.

If the system 200 includes more than one computer subsystem 202, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 208 may be configured to perform a number of functions using the output of the system 200 or other output. For instance, the processor 208 may be configured to send the output to an electronic data storage unit 209 or another storage medium. The processor 208 may be further configured as described herein.

The processor 208 or computer subsystem 202 may be part of a defect review system, an inspection system, a metrology system, or some other type of system. Thus, the embodiments disclosed herein describe some configurations that can be tailored in a number of manners for systems having different capabilities that are more or less suitable for different applications.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 208 may be configured according to any of the embodiments described herein. The processor 208 also may be configured to perform other functions or additional steps using the output of the system 200 or using images or data from other sources.

In another embodiment, the processor 208 may be communicatively coupled to any of the various components or sub-systems of system 200 in any manner known in the art. Moreover, the processor 208 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 208 and other subsystems of the system 200 or systems external to system 200.

In some embodiments, various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 208 (or computer subsystem 202) or, alternatively, multiple processor 208 (or multiple computer subsystems 202). Moreover, different sub-systems of the system 200 may include one or more computing or logic systems. Therefore, the above description should not be interpreted as a limitation on the present disclosure but merely an illustration.

An additional embodiment relates to a non-transitory computer-readable medium storing program instructions executable on a processor. In particular, a processor, such as the processor 208, can be coupled to a memory in an electronic data storage medium with non-transitory computer-readable medium, such as the electronic data storage medium 209, that includes executable program instructions. The computer-implemented method may include any step(s) of any method(s) described herein. For example, processor 208 may be programmed to perform some or all of the steps of an embodiment of the method 100. The memory in the electronic data storage medium 209 may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

In an embodiment, one or more programs are included on a non-transitory computer-readable storage medium, such as the electronic data storage medium 209. The one or more programs are for executing steps on one or more computing devices. For example, a defect detection model can be included on the electronic data storage medium 209. The model can be trained using semi-supervised machine learning. The model, which can be operated using a processor, may be configured to receive an image of a wafer and determine presence of one or more anomalies in the image. The image may be an SEM image. The model can trained using nominal patterns or only using defect-free training images. The model can include a variational autoencoder, such as a variational autoencoder that includes ladder networks.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a wafer inspection tool configured to generate images of a wafer, wherein the wafer inspection tool includes an electron beam source and a detector; and
a processor in electronic communication with the wafer inspection tool, wherein the processor operates a model configured to find one or more anomalies in the images, wherein the model is trained using semi-supervised machine learning based on only defect-free training images of semiconductor devices.

2. The system of claim 1, wherein the wafer inspection tool is a scanning electron microscope.

3. The system of claim 1, wherein the model includes a variational autoencoder.

4. The system of claim 3, wherein the variational autoencoder includes ladder networks.

5. A method comprising:
receiving an image of a wafer at a processor, wherein the processor operates a model configured to find one or more anomalies in the image, wherein the model is trained using semi-supervised machine learning based on only defect-free training images of semiconductor devices; and
determining presence of one or more anomalies in the image using the model.

6. The method of claim 5, wherein the image is a scanning electron microscope image.

7. The method of claim 5, wherein the training uses nominal patterns.

8. The method of claim 5, wherein the model includes a variational autoencoder.

9. The method of claim 8, wherein the variational autoencoder includes ladder networks.

10. The method of claim 5, further comprising obtaining the image using a wafer inspection tool.

11. The method of claim 10, wherein the wafer inspection tool is a scanning electron microscope.

12. The method of claim 5, wherein the one or more anomalies are each one of an anomaly patch or an anomaly region.

13. The method of claim 5, further comprising:
- determining, using the processor, a distance between the image and the defect-free training images in a feature space; and
- determining, using the processor, if the image is an outlier based on the distance.

14. The method of claim 5, further comprising determining, using the processor, if the image is an outlier using a generative adversarial network with an autoencoder as a generator and a convolutional neural network as a discriminator.

15. A non-transitory computer-readable storage medium, comprising one or more programs for executing a model on one or more computing devices, wherein the model is trained using semi-supervised machine learning based on only defect-free training images of semiconductor devices, and wherein the model is configured to:
- receive an image of a wafer; and
- determine presence of one or more anomalies in the image.

16. The defect detection model of claim 15, wherein the image is a scanning electron microscope image.

17. The defect detection model of claim 15, wherein the model is trained using nominal patterns.

18. The defect detection model of claim 15, wherein the model includes a variational autoencoder.

19. The defect detection model of claim 18, wherein the variational autoencoder includes ladder networks.

20. The defect detection model of claim 15, wherein the model is configured to perform outlier detection thereby detecting anomalies.

\* \* \* \* \*

UNITED STATES PATENT AND TRADEMARK OFFICE
CERTIFICATE OF CORRECTION

PATENT NO. : 10,789,703 B2
APPLICATION NO. : 16/106341
DATED : September 29, 2020
INVENTOR(S) : Lu et al.

It is certified that error appears in the above-identified patent and that said Letters Patent is hereby corrected as shown below:

In the Claims

Column 14, Line 6, in Claim 16, "The defect detection model of claim 15" should read:
--The non-transitory computer-readable storage medium of claim 15--;

Column 14, Line 8, in Claim 17, "The defect detection model of claim 15" should read:
--The non-transitory computer-readable storage medium of claim 15--;

Column 14, Line 10, in Claim 18, "The defect detection model of claim 15" should read:
--The non-transitory computer-readable storage medium of claim 15--;

Column 14, Line 12, in Claim 19, "The defect detection model of claim 15" should read:
--The non-transitory computer-readable storage medium of claim 15--;

Column 14, Line 14, in Claim 20, "The defect detection model of claim 15" should read:
--The non-transitory computer-readable storage medium of claim 15--.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*